Nov. 16, 1926.
M. L. FRINK
1,606,989
TOOL FOR USE IN SPLICING, TWISTING, AND STRETCHING WIRE
Filed Dec. 5, 1925.
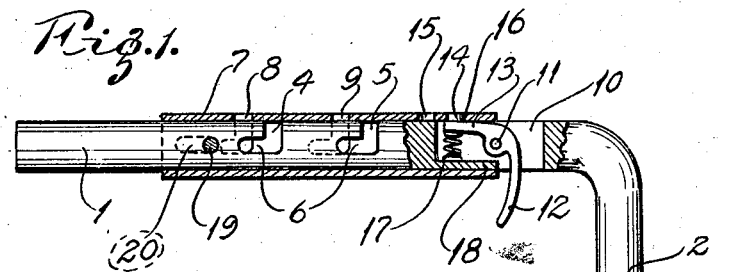
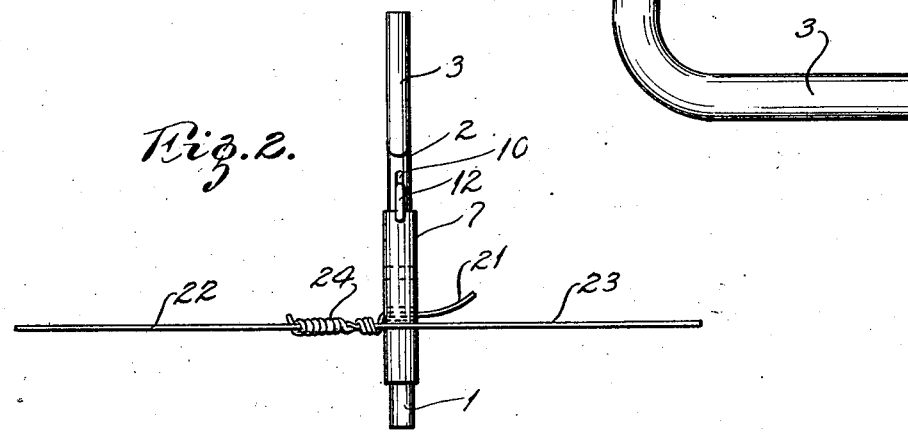
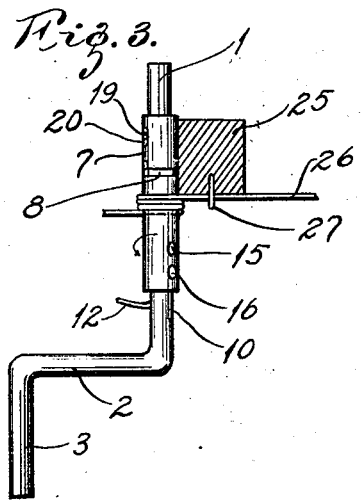
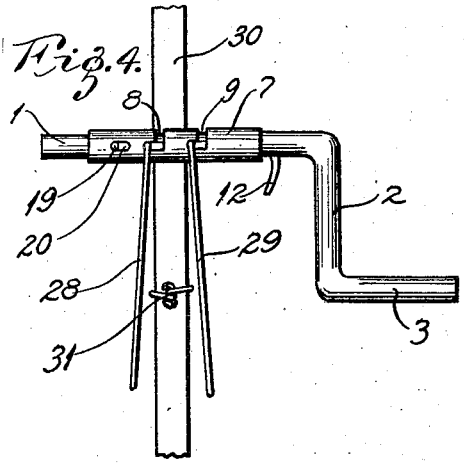
INVENTOR:-
MELVIN L. FRINK.
By Bruce S. Elliott
ATTORNEY.

Patented Nov. 16, 1926.

1,606,989

UNITED STATES PATENT OFFICE.

MELVIN L. FRINK, OF WELLSTON, MISSOURI, ASSIGNOR OF ONE-HALF TO WALTER J. HOLLIER, OF ST. LOUIS, MISSOURI.

TOOL FOR USE IN SPLICING, TWISTING, AND STRETCHING WIRE.

Application filed December 5, 1925. Serial No. 73,335.

This invention relates to a novel tool for use in twisting, splicing, stretching, and otherwise manipulating, wire.

The general object of the invention is to provide a tool which may readily be applied to the wire, or to a plurality of wires, and will enable the wire to be manipulated in the desired manner with great facility and rapidity as compared with present methods.
The invention resides, essentially, in a bar of metal bent to afford a shank portion and a crank or handle portion, and having in the shank portion, preferably two bayonet slots opening from one side of the shank, and a sleeve provided on one side with transverse slots slidably mounted on the shank, so that the slots therein may be brought into and out of register with the slots in the shank. A spring-controlled trigger having a stud co-operating with openings in the sleeve is manipulated to permit the movement of the sleeve, and then, when released, to engage one or the other of the openings to hold the sleeve in its adjusted position. A pin on the shank working in a groove on the sleeve serves to limit the movement of the latter.

The invention is illustrated in the accompanying drawing, in which—

Figure 1 is a view partly in section and partly in elevation of my improved tool;

Figure 2 is a plan view on a smaller scale showing the tool in the position it occupies with reference to a wire strand in the operation of splicing;
Figure 3 is a plan view of the implement showing it in position against a post, shown in section, this view illustrating the application of the tool in stretching one of the strands of a wire fence; and Figure 4 is a view in front elevation showing the tool with two strands mounted therein ready to be twisted about a fence paling.

Referring to the drawing, the numeral 1 indicates a round bar forming what I have termed the shank of my tool and being bent at one end at right angles to form a crank 2, which crank portion, at its outer end, is again bent outwardly at right angles to provide a handle 3. The shank 1 is provided on what may be termed its upper side with two transversely disposed slots 4 and 5, which cut through about half the diameter of the shank, and at their lower ends have longitudinal extensions 6 which are preferably directed outwardly or toward the free end of the shank. Slidably mounted on this shank is a sleeve 7 which is provided with bayonet-shaped slots 8 and 9, corresponding in shape and dimensions to the slots 4 and 5, as shown by the dotted lines in Figure 1, and in elevation in Figure 4. Near the crank 2, the shank 1 is provided with a recess 10 extending in part entirely through the shank, and pivotally mounted at 11 in the walls of this recess is a trigger 12, projecting through the recess below the bottom of the shank portion and having an integral arm 13 provided on its upper side at its outer end with a stud 14 adapted to engage in one or the other of two openings 15, 16 in sleeve 7. A coil spring 17 interposed between the arm 13 and a bottom portion 18 of the recess 10 serves to throw the arm 13 and stud 14 upward to engage in one or the other of said openings whenever the trigger 12 is released. Secured on the shank 1 is a pin 19 which engages in a slot 20 provided near the outer end of the sleeve 7, whereby the movement of the sleeve on the shank in either direction is limited.

With the parts in the position shown in Figure 1, to apply the tool to a wire, the trigger 12 will be pulled to lower the stud 14 out of engagement with the opening 16. The sleeve 7 is then pushed backward, or toward the crank portion 2, to bring the slots 8 and 9 therein into register with the slots 4 and 5. If one end of a wire strand is to be wrapped around the strand, or another strand, as in splicing, such end of the wire is inserted through one or the other of the slots 8 or 9 and passed into the extension 6 of one or the other of the slots 4 or 5. When the sleeve 7 is pushed back to bring the slots therein into register with the slots in the shank, the trigger is released and the stud 14 engages in the opening 15. With the wire inserted as described above, the trigger is again pulled to remove the stud 14 from the opening 15 and the sleeve is then pushed forwardly to the position shown in Figure 1, so that the sleeve covers the slots 4 and 5, the trigger 12 is released, and the stud 14 again engages in the opening 15, as shown. This may be the position of the parts as shown in Figure 2, in which the end 21 of a wire 22 is shown being wrapped about a wire 23 to form a splice 24. In wrapping the end of the wire about the strand, the operator grasps the crank portion 2, or the handle portion 3, whichever is most convenient, and rotates the implement about the wire 23, which causes the end portion 21 to be wrapped about this wire, as shown. In stretching a wire strand, the end portion of the wire is inserted in the tool in the manner previously described; the latter is placed against the far side of a post 25, as shown by Figure 3, and by grasping the handle 3, the tool is turned to wrap the wire about the sleeve 7 until the wire indicated by 26, is stretched sufficiently taut. A staple 27, which may previously have been placed over the wire and partly driven into the post 25, is then driven home to hold the wire in its stretched condition.

In the use of the tool in twisting wires about a paling in constructing a fence, the two wires 28, 29 (Figure 4) to be twisted are inserted in the slots 4 and 5 in the manner previously described, and the sleeve 7 moved to the position shown in Figure 1, which, of course, acts to retain the wires in the slots of the shank. The tool is then rotated in either direction in a plane parallel with the paling 30 to twist the wires about the same, and at a point suitably removed from the paling 30, a new paling is inserted between the wires and the implement turned in the reverse direction to twist the wires about the inserted paling. By turning the tool alternately in different directions, the wires 28 and 29 which, of course, are on spools, are prevented from being twisted together; or rather, they are twisted together in one operation and untwisted in the next. The wires are usually twisted about the palings at two or more points thereon, and one of these twists is located on the paling 30 at 31.

My improved tool greatly facilitates the operation of splicing, especially in its use with telegraph and telephone wires. For this purpose, it is customary to use pliers, and the operator has first to grasp the end of the wire with the pliers and wrap it about the strand as far as he can in one movement of the arm, and then release it. He then engages the end of the wire with the pliers from another position relative to the strand and again wraps the wire about the strand as far as he can in one movement, and continues this operation until the wrapping is finished. Frequently, this operation also necessitates transferring the pliers from one hand to the other, and, under any circumstances, the operation requires considerable time. With my improved tool, with the wire engaged in one of the slots, the tool is simply continuously rotated about the wire strand until the wrapping is completed; and although it may be necessary to transfer the tool from one hand to the other, this involves practically no extra time, as the wire cannot slip out of the tool and the required motion of the hands is a perfectly natural one and easily performed. Furthermore, as the strand about which the end of the wire is being wrapped forms a purchase for the tool in turning, it follows that the wire will be wrapped firmly about the strand, as it is continuously pulled into engagement therewith as it is being wrapped. As the leverage afforded is very great, this involves practically no appreciable amount of energy on the part of the operator. With the use of pliers, the wire must be pulled in order to be wrapped tight, and with relatively thick wire and a relatively long splice, the operation is of a more or less laborious nature, requiring the exercise of considerable strength on the part of the operator.

The ease with which a wire fence strand may be stretched in the manner illustrated in Figure 3, or two wires twisted about a paling in the manner illustrated in Figure 4, will be at once apparent, and the advantages possessed by the tool in its use in these operations are as equally pronounced as in the case of its use in splicing wire.

I claim:

1. A tool of the class described, comprising a bar affording a shank and a handle portion and provided in the shank with a transverse wire-receiving slot, a sleeve slidably mounted on the shank and provided with a wire-receiving slot corresponding to that of the shank, said sleeve being movable longitudinally over the shank to bring the slots into and out of register.

2. A tool of the class described, comprising a bar affording a shank and a handle portion and provided in the shank with a bayonet slot, a sleeve slidably mounted on the shank and provided with a corresponding slot, said sleeve being movable over the shank to bring said slots into and out of register, and means for limiting the movement of the sleeve in either direction.

3. A tool of the class described, comprising a bar affording a shank and a handle portion and provided in the shank portion with a plurality of bayonet slots, a sleeve slidably mounted on the shank and provided with slots corresponding to those of the shank, said sleeve being movable to bring said slots into and out of register, and manually-operated means mounted on the shank and adapted to engage said sleeve to hold it in either of its two positions.

4. A tool of the class described, comprising a bar affording a shank and a handle portion and provided in the shank portion with a plurality of bayonet slots, a sleeve slidably mounted on the shank and provided with slots corresponding to those of the shank and with two openings, said sleeve being movable in opposite directions over the shank to bring the slots into and out of register, and a trigger mounted on the shank and having a projection for engaging in one or the other of said openings to hold the sleeve in either of its two positions.

5. A tool of the class described, comprising a bar affording a shank and a handle portion and provided in the shank portion with a plurality of bayonet slots, a sleeve slidably mounted on the shank and provided with slots corresponding to those of the shank and with two openings, said sleeve being movable in opposite directions over the shank to bring the slots into and out of register, a trigger mounted on the shank and having a projection for engaging in one or the other of said openings to hold the sleeve in either of its two positions, and means for limiting the movement of the sleeve in either direction.

In testimony whereof, I have hereunto set my hand.

MELVIN L. FRINK.